(12) United States Patent
Dygert et al.

(10) Patent No.: US 10,195,781 B2
(45) Date of Patent: Feb. 5, 2019

(54) FLEXIBLE PANEL TO OFFSET PRESSURE DIFFERENTIAL

(75) Inventors: Doug Dygert, Olive Branch, MS (US); Dan Gamber, Smyrna, TN (US); Doug Woodring, Summerville, TN (US)

(73) Assignee: RING CONTAINER TECHNOLOGIES, LLC, Oakland, TN (US)

(*) Notice: Subject to any disclaimer, the term of this patent is extended or adjusted under 35 U.S.C. 154(b) by 348 days.

(21) Appl. No.: 14/006,232

(22) PCT Filed: Mar. 26, 2012

(86) PCT No.: PCT/US2012/030555
§ 371 (c)(1),
(2), (4) Date: Jan. 16, 2014

(87) PCT Pub. No.: WO2012/129559
PCT Pub. Date: Sep. 27, 2012

(65) Prior Publication Data
US 2014/0131368 A1    May 15, 2014

Related U.S. Application Data

(60) Provisional application No. 61/467,010, filed on Mar. 24, 2011.

(51) Int. Cl.
*B29C 49/54* (2006.01)
*B65D 1/02* (2006.01)
(Continued)

(52) U.S. Cl.
CPC .......... *B29C 49/541* (2013.01); *B65D 1/0276* (2013.01); *B65D 1/165* (2013.01); *B65D 79/005* (2013.01)

(58) Field of Classification Search
USPC ........................................................ 220/609
See application file for complete search history.

(56) References Cited

U.S. PATENT DOCUMENTS 5,201,438 A       4/1993 Norwood
2004/0232103 A1  11/2004 Lisch et al.
(Continued)

OTHER PUBLICATIONS

International Search Report, PCT/US2012/030555, dated Jun. 20, 2012.

*Primary Examiner* — James N Smalley
*Assistant Examiner* — Madison L Poos
(74) *Attorney, Agent, or Firm* — Sorell, Lenna & Schmidt, LLP

(57) ABSTRACT

Provided is a container that includes a top having an opening configured to receive a product. The container also includes a bottom adjoining a sidewall that extends to the top of the container and a flexible panel disposed on the bottom and having a plurality of surfaces that each extend radially around a longitudinal axis of the container. One of the plurality of surfaces comprises a downward ramp that extends away from the top of the container when moving radially inward along the downward ramp and another of the surfaces comprises an upward ramp that extends toward the top of the container when moving radially inward along the upward ramp. The surfaces may include dimples protruding inward from the outer surface of the container that have an interlocking pattern.

20 Claims, 8 Drawing Sheets

(51) Int. Cl.
    *B65D 1/16*      (2006.01)
    *B65D 79/00*     (2006.01)

(56) References Cited

U.S. PATENT DOCUMENTS

| | | | |
|---|---|---|---|
| 2007/0084821 A1* | 4/2007 | Bysick ................. | B65D 1/0276 |
| | | | 215/373 |
| 2007/0199915 A1* | 8/2007 | Denner ................ | B65D 79/005 |
| | | | 215/375 |
| 2009/0159556 A1* | 6/2009 | Patcheak .............. | B65D 1/0276 |
| | | | 215/373 |
| 2009/0242575 A1* | 10/2009 | Kamineni ............ | B65D 1/0276 |
| | | | 220/608 |
| 2012/0037645 A1* | 2/2012 | Boukobza ............ | B65D 1/0276 |
| | | | 220/600 |
| 2013/0213926 A1* | 8/2013 | Kurihara .............. | B65D 1/0276 |
| | | | 215/371 |

* cited by examiner

FLEXIBLE PANEL TO OFFSET PRESSURE DIFFERENTIAL

This application claims the benefit of U.S. Provisional Patent Application No. 61/467,010 filed on Mar. 24, 2011 in the U.S. Patent Trademark Office, the disclosure of which is incorporated herein in its entirety by reference.

BACKGROUND OF THE INVENTION

1. Field of the Invention

Apparatuses and methods consistent with the present invention relate to a container having a flexible panel to offset a pressure differential. For example, may be used with oxygen scavenging products that may produce a vacuum in the container over time.

2. Description of the Related Art

Products, such as mayonnaise and peanut butter, tend to scavenge oxygen over time. When sealed in a container, this creates a vacuum that may collapse the side walls of the container. That is, if the vacuum pressure is greater than the resistance of the sidewalls, the container walls collapse or buckle. As a result, the appearance of a paneled cylindrical container is not appealing to the consumer, which in turn, may result in a defective product. In the related art, to address this problem, additional material is added to the sidewalls of the container to strengthen the cylinder and offset vacuum pressure. For example, the container shown in FIG. 1 includes additional material as well as ribs to prevent or decrease the likelihood of collapsing. See FIG. 1. The added material is undesirable because in increases the weight of the container. The ribs tend to detract from the aesthetic design of the bottle while making it difficult to remove product from the container.

SUMMARY OF THE INVENTION

Aspects of the invention relate to a PET container having a flexible panel that moves to offset pressure differentials experience by a container, for example, the vacuum generated by oxygen scavenging products.

According to one aspect, a container is provided that comprises a top having an opening configured to receive a product; a bottom adjoining a sidewall that extends to the top of the container; and a flexible panel having a plurality of surfaces that each extend radially around a longitudinal axis of the container, wherein one of the plurality of surfaces comprises a downward ramp that extends away from the top of the container when moving radially inward along the downward ramp and another of the surfaces comprises an upward ramp that extends toward the top of the container when moving radially inward along the upward ramp.

According to another aspect, the container may include a downward ramp that adjoins the upward ramp. The upward ramp may be disposed radially inward of the downward ramp.

According to another aspect, the container may further comprise a bullet-nose structure on the bottom of the container extending as a convex structure upward along a central longitudinal axis of the container; and the plurality of surfaces may further comprise a stage extending radially outward from the bullet-nose to connect to one of the plurality of surfaces.

According to another aspect, the stage may adjoin the upward ramp.

According to another aspect, at least one of the plurality of surfaces may comprise dimples extending from an outer side of the one of the plurality of surfaces to an inside of the container. The dimples may be configured to adjoin adjacent dimples. The dimples may have a diamond cross-section. Each of the dimples may have a constant length in the radial direction. The width of the dimples in the circumferential direction may decrease between dimples when moving from an outer radial direction toward an inward radial direction, According to another aspect, the interlocking dimples may form a spirally shaped hinge extending along the upward ramp and the downward ramp.

BRIEF DESCRIPTION OF THE DRAWINGS

The above and other aspects and features of the various aspects of the present invention will become more apparent by describing in detail exemplary embodiments thereof with reference to the attached drawings in which.

DETAILED DESCRIPTION OF THE INVENTION

A PET container having a flexible panel according to the various aspects of the invention is described below with reference to various embodiments in conjunction with the accompanying drawings. The embodiments described below are intended to illustrate the various aspects without limiting the claimed invention.

Figure 1:
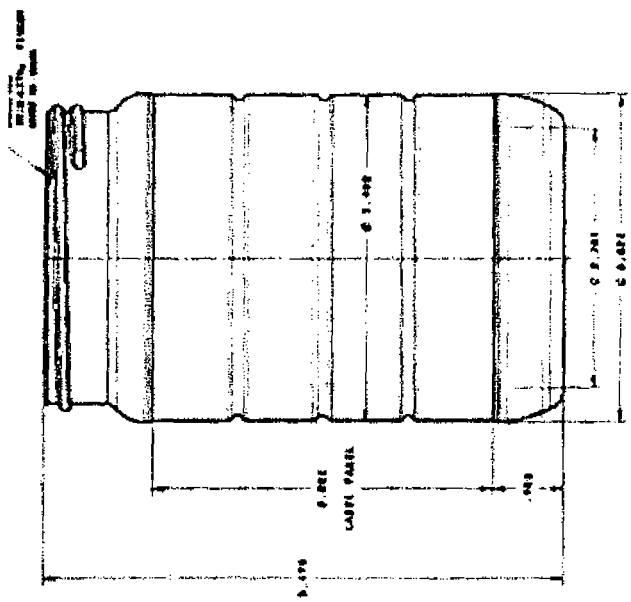
FIG. 1 shows container in accord with the related art.
Figure 2:
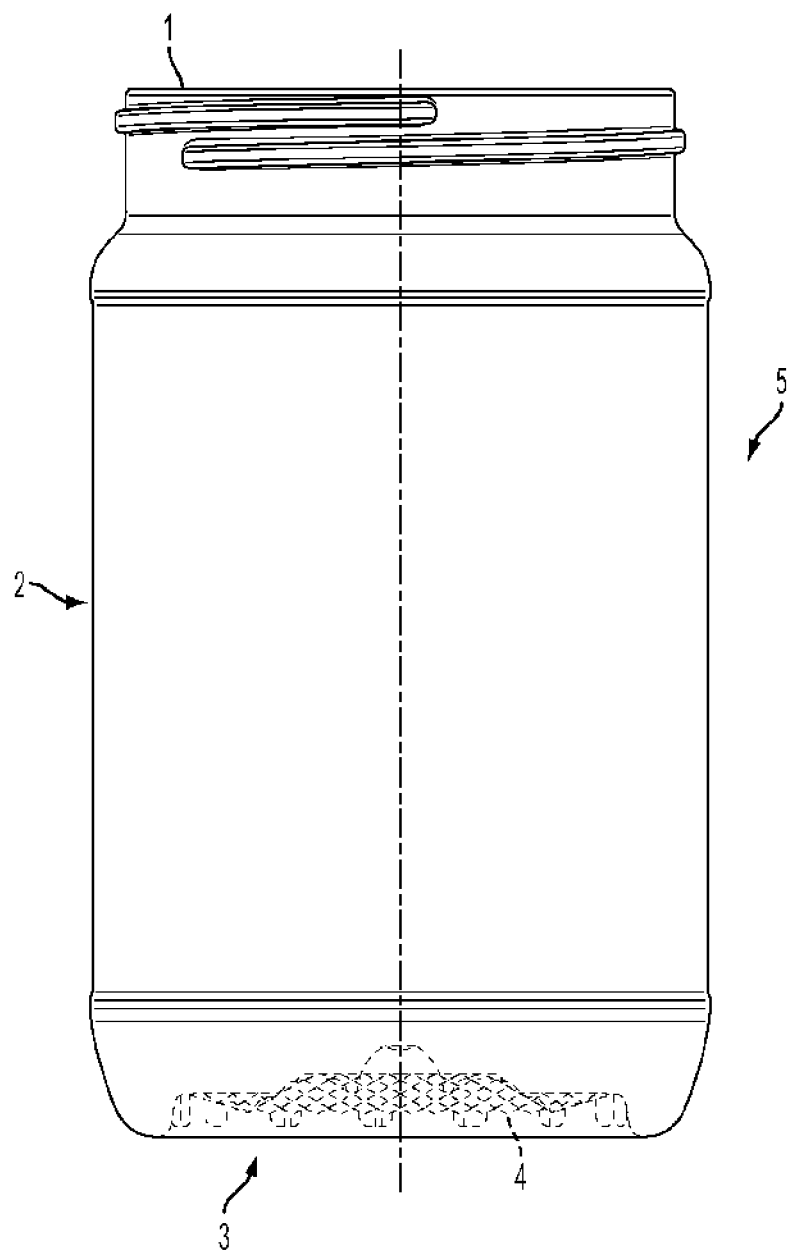
FIG. 2 is a side view of a container having a flexible panel in the base according to an exemplary embodiment.

FIG. 2 illustrates a PET container 5 having a top opening 1, a sidewall 2 that connects the top 1 to a bottom 3 of the container. The bottom 3 of the container 5 includes a flexible panel 4. When the inside of the container 5 is subjected to pressures lower than atmospheric pressure, the flexible panel 4 is designed to move inwardly before other portions of the container 5, such as the side wall 2 move, to prevent any buckling of the side wall 2.

By virtue of this flexible panel design, the sidewall 2 may be formed as flat cylindrical or planar surfaces without requiring additional material (thickness) or structures, such as ribs, to prevent buckling. Thus, the outward appearance of the container 5 to a consumer does not suffer any degradation over time when a product inside the container scavenges oxygen or otherwise is subjected to less than atmospheric pressure.

Figure 3:
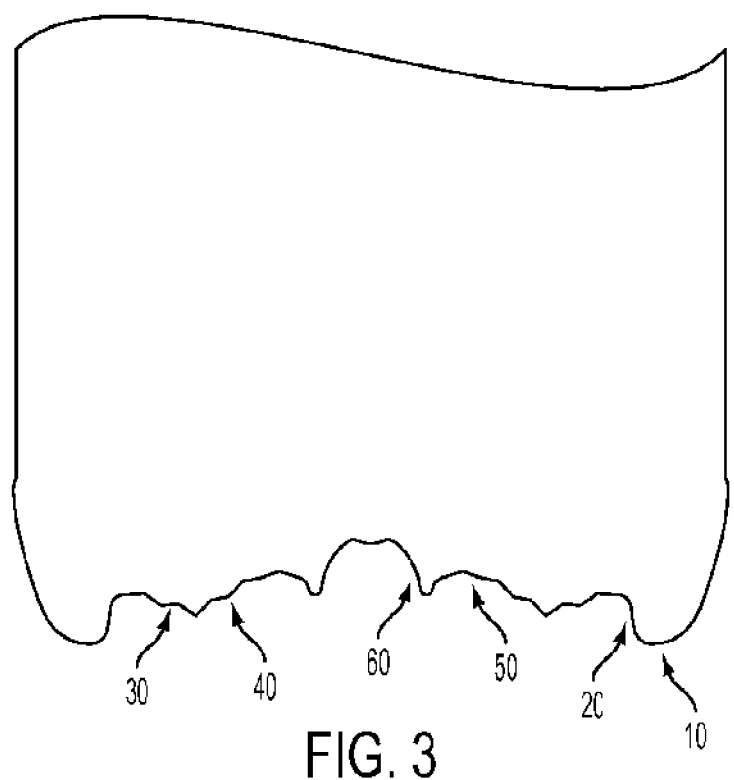
FIG. 3 shows a cross-sectional view along the outer surface of the bottom of the container of FIG. 2.
Figure 4:
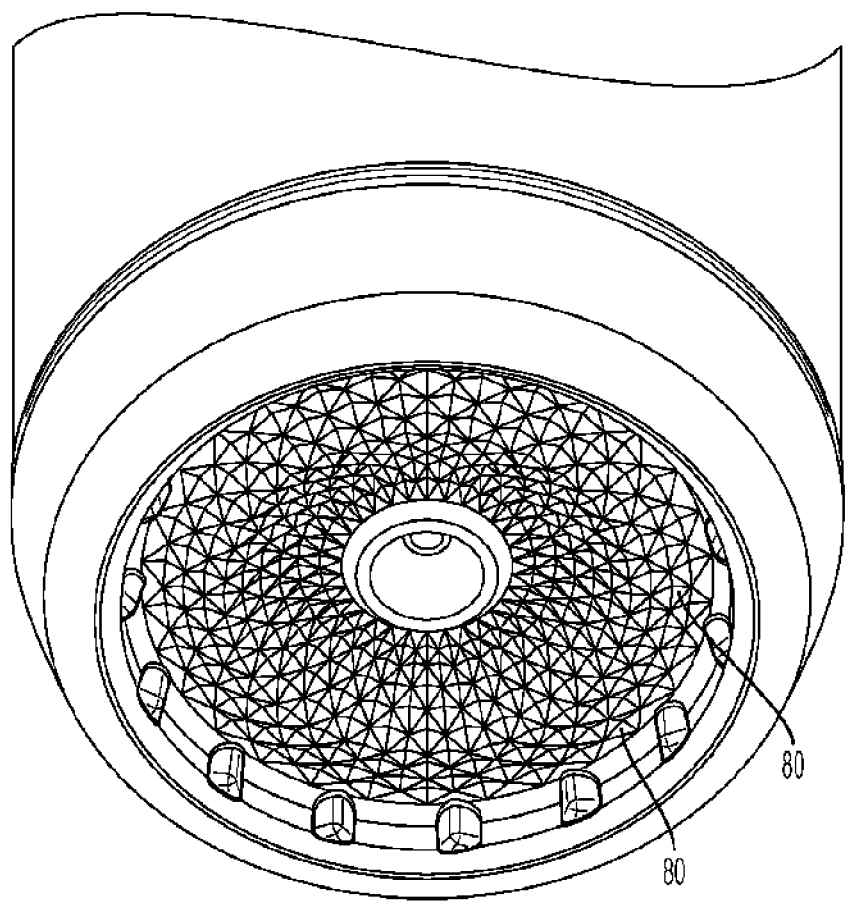
FIG. 4 is a perspective view of the bottom portion of the container of FIG. 1.
Figure 5:
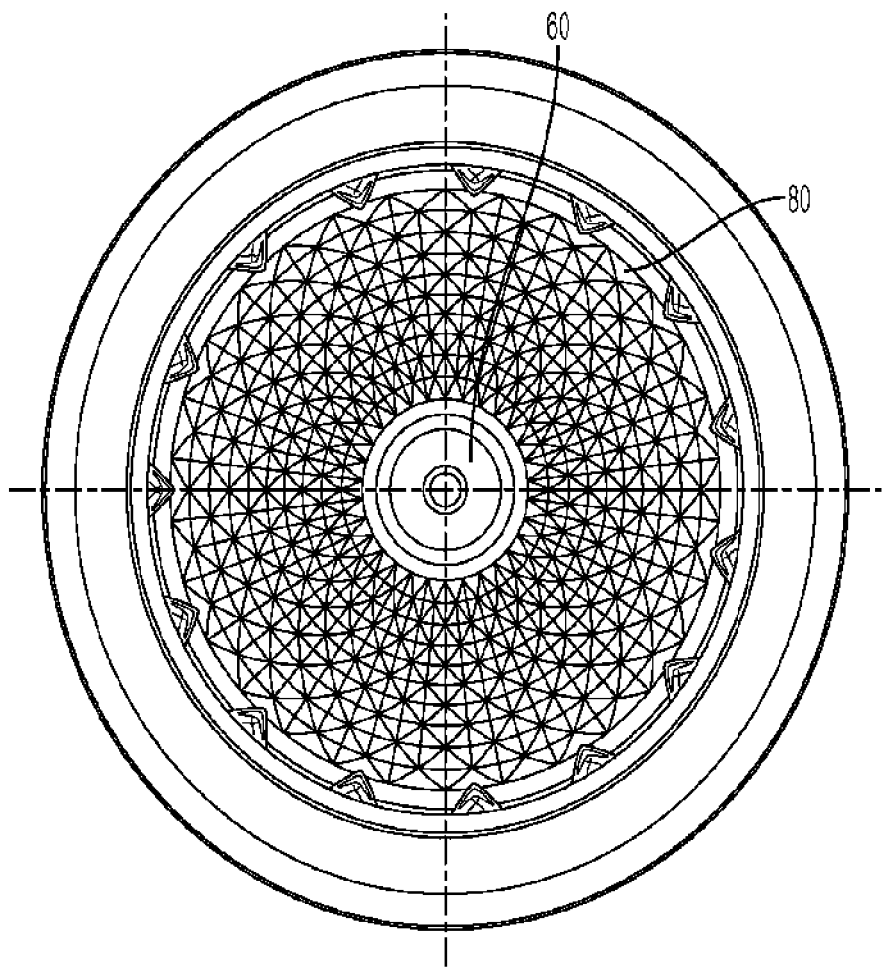
FIG. 5 is a bottom view of the container of FIG. 5.
Figure 6:
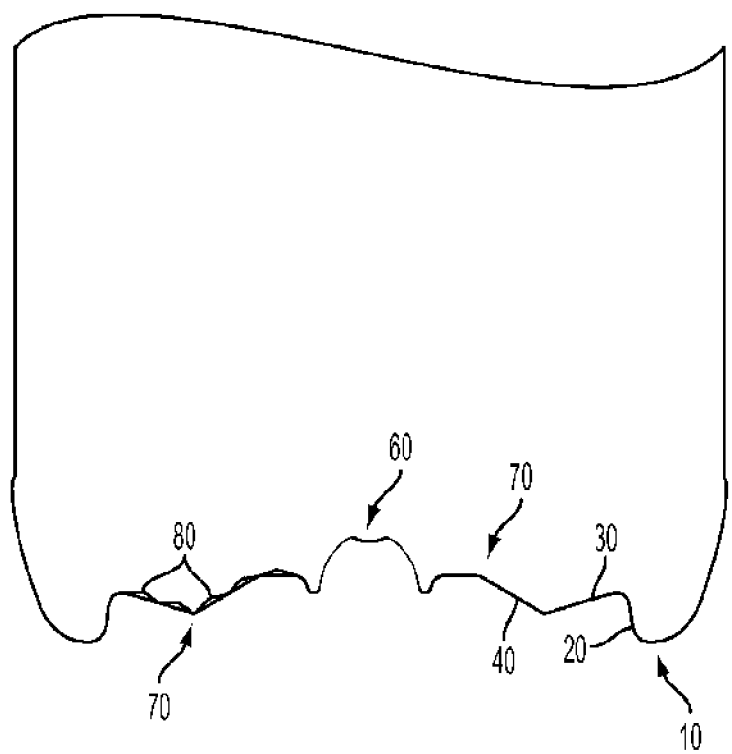
FIG. 6 is another cross-sectional view highlighting the inwardly extending dimples of the container of FIG. 1.
Figure 8:
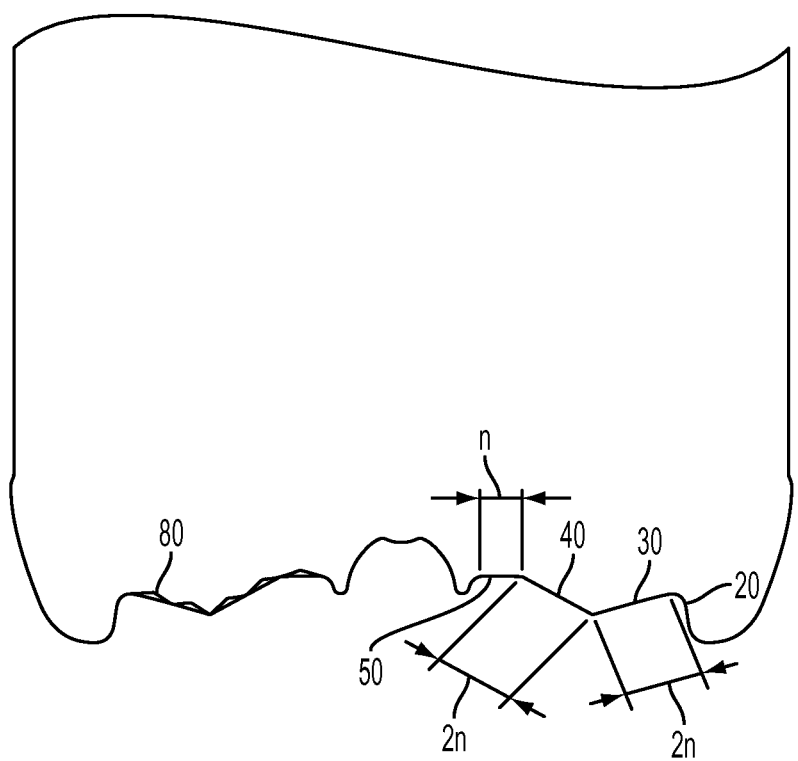
FIG. 8 is cross-sectional view of the container of FIG. 1.

FIGS. 3, 6 and 8 are cross-sectional views showing the general structure of the flexible panel 4 on the bottom 3 of the container 5. The lowest portion of the bottom 3 is a contact surface 10, which is configured to support the container 5 when resting on a surface. Radially inward from this contact surface 10 is an upwardly extending pushup wall 20 that extends upwardly from the contact surface 10. Extending from the pushup wail 20 is a downward ramp 30. The downward ramp 30 extends radially inward from the pushup wall 20 and away from the top 1 of the container. Thus, the downward ramp 30 forms and angle with a virtual horizontal resting surface extending between the lowest most portions of the contact surface 10. At the most radially inward point of this downward ramp 30, an upward ramp 40 extends radially inward but in a different direction. That is, the upward ramp 40 extends radially inward and toward the top 1 of the container. This upward ramp 40 also forms an angle with the virtual horizontal resting surface.

Disposed in the center of the bottom 3 of the container is a bullet-nose 60. The bullet-nose 60 is generally a bullet shaped structure that extends upward toward the top 1 of the container. This bullet-nose 60 is characterized by a convex side surface and a concave top surface as viewed from the bottom of the container 5. The bullet-nose is connected to the upward ramp 40 by a stage 50 that is substantially horizontal. Each of the downward ramp 30, the upward ramp 40 and the stage 50 extend circumferentially around the longitudinal center of the container 5 to form annular surfaces.

Because the PET container is formed by blow molding a preform, having these surfaces extend at different angles increases the surface area of the bottom of the container. As this increased surface area must be covered by a corresponding part of the perform material during blow molding, the thickness of these portions is thinner than if the bottom of the container would be formed of a substantially linear or flat surface. This tends to improve the ability of the bottom 3 of the container 5 to flex before the sidewall 2 of the container when experiencing an internal pressure lower than the external pressure (atmospheric). That is, it prevents a collapsing of the sidewall 2.

Another aspect to this structure is the ability of the upward ramp 40 and downward ramp 30 to move dynamically without increasing the radial tension at the bottom 3 of the container 5. For example, when all of the surfaces of the bottom of a container have longitudinal components extending in the same direction, i.e., longitudinally toward the top of the container 5, tension is created in the radial direction along these surfaces when the container experiences a low internal pressure that cause the bottom of the container to move upward. This tension reduces the ability of the bottom to move upward in response to a low pressure.

On the other hand, in the embodiment of FIGS. 3, 6 and 8, during the upward movement of the bullet-nose 60 of the container 5, the angle between the upward ramp 40 and the downward ramp 30 tends to reduce, thus reducing or preventing any such tension from building. The same angular reduction is also experienced between the upward ramp 40 and the stage 50. This combination of adjoining surfaces that extend at positive and negative angles with respect to the virtual horizontal resting surface create hinge points 70 that permit relative movement between the adjoining surfaces without unnecessarily increasing tension. This enables the flexible panel 4 to move more easily for a given material thickness. Thus, the structure of these aspects of the flexible panel 4 help to reduce the material thickness and provide a moving surface that does not induce high tension upon upward movement.

While three surfaces (stage 50, upward ramp 40 and downward ramp 30) are shown in the embodiment described herein, additional surfaces may be used depending on the size of the bottle and the amount of deformation required.

The angles of the upward ramp 40 and the downward ramp 30 may vary depending upon the length of these annular surfaces in the radial direction. However, in the present embodiment, the radial length of the upward ramp 40 and the downward ramp 30 are set to a length $2n$ with the length of the stage 50 being n. Also, in this embodiment, the angle of the upward ramp 40 with respect to the virtual horizontal resting surface is preferably 24-32 degrees, but more preferably 26-30 degrees. If the angle is set too high, too much thinning may occur during blow molding and if the angle is set too low, the movement of the flexible panel 4 may be compromised. The angles of the downward ramp 30 in this embodiment are set at about 15 degrees and is preferably in the range of 11-19 degrees.

Another aspect of this embodiment is illustrated in FIGS. 4, 5, 6 7 and 8. This aspect relates to an interlocking dimple or surface pattern formed on the surfaces of the flexible panel 4. These dimples extend inwardly from the outside surface of the flexible panel. These dimples provide a similar function to the upward ramp and downward ramp described above. That is, they create additional surface area that thins the material during blow molding to add more flexibility to the flexible panel 4. The dimples shown in FIGS. 4, 5, 6, 7 and 8 appear diamond shaped from the surface and have a pyramid shape. However, the surface area of these surfaces may be increased by making these dimples of any shape or cross section, for example, trapezoidal, rectangular, circular, conical or spherical.

Figure 7:
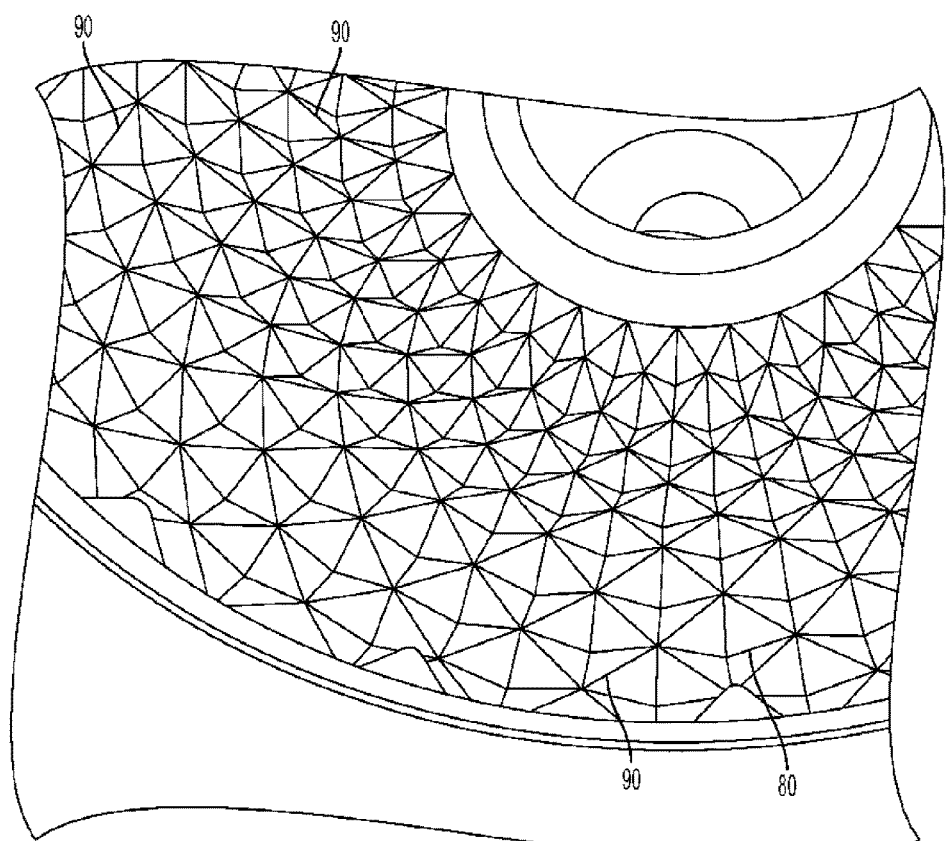
FIG. 7 is a grayscale perspective view of a portion of the bottom of the container of FIG. 1.

However, the flexibility of the flexible panel 4 may be further improved if the dimples as shaped so that they can be interlocked throughout the surfaces. That is, the dimples may be shaped so as to adjoin each other along their peripheries so as to create additional hinge points 90. They may be designed to interlock on some sides while not interlocking on others. As is shown in FIG. 7, when the diamond shape is used, the dimples are interlocking on all peripheral sides at the outer surface of the container 5. In this configuration, a spiral shaped hinge is created that extends from the radial outer side of the downward ramp 30 through the stage 50. To accomplish this type of interlock, the radial length of each dimple is maintained from the radial outward dimples 80 to the radial inward dimples 80. However, the width of the dimples 80 decreases from the radial outward dimples 80 to the radial inward dimples 80.

This, while the number of dimples and the size of the dimples may change, the number of dimples extending in each of the radial direction of the upward ramp 40 and the downward ramp 30 is greater than the number of dimples extending in the radial length of the stage 50. For example, in the configuration of FIG. 8, two dimples 80 are extending in the radial direction of each of the upward ramp 40 and the downward ramp 30 with one dimple extending in the radial direction of the stage 50. While much of the flexible base 4 is covered with dimples 80 in the embodiments disclosed herein, the container 5 may be configured to have dimples on only one or some of the moving surfaces, i.e., stage 50, upward ramp 40 or downward ramp 30, without having dimples on another surface.

What is claimed is:

1. A container, comprising:
   a top having an opening configured to receive a product;
   a bottom adjoining a sidewall that extends to the top of the container, the bottom forming the bottommost portion of the container;
   a pushup wall extending upward from the bottommost portion radially inward of the sidewall, the pushup wall comprising a plurality of vertical ribs spaced circumferentially about the pushup wall;
   a flexible panel having a plurality of surfaces that each extend radially around a longitudinal axis of the container, the flexible panel extending radially inward from an upper part of the pushup wall; and a bullet-nose structure on the bottom of the container extending upward along a central longitudinal axis of the container, the bullet-nose structure having a concave top surface, wherein one of the plurality of surfaces comprises a downward ramp that adjoins the upper part of the pushup wall and extends away from the top of the container when moving radially inward along the downward ramp, another of the surfaces comprising an upward ramp that extends toward the top of the container when moving radially inward along the upward ramp, a bottommost portion of the bullet-nose structure being positioned below a topmost portion of the upward ramp.

2. The container according to claim 1, wherein the downward ramp adjoins the upward ramp.

3. The container according to claim 2, wherein the upward ramp is disposed radially inward of the downward ramp.

4. The container according to claim 1, wherein: the bullet-nose structure extends as a convex structure upward along the central longitudinal axis of the container; and the plurality of surfaces further comprises a stage extending radially outward from the bullet-nose to connect to one of the plurality of surfaces.

5. The container according to claim 4, wherein the stage adjoins the upward ramp such that an upper portion of the stage is positioned above a lower portion of the bullet-nose structure.

6. The container according to claim 1, wherein at least one of the plurality of surfaces comprises dimples extending from an outer side of the one of the plurality of surfaces to an inside of the container.

7. The container according to claim 6, wherein the dimples adjoin adjacent dimples.

8. The container according to claim 7, wherein the dimples have a diamond cross-section.

9. The container according to claim 8, wherein each of the dimples have a constant length in a radial direction of the container.

10. The container according to claim 9, wherein a width of the dimples in a circumferential direction decreases between dimples when moving from an outer radial direction toward an inward radial direction.

11. The container of claim 10, wherein the dimples are interlocking dimples form a spirally shaped hinge extending along the upward ramp and the downward ramp.

12. The container according to claim 4, wherein at least one of the plurality of surfaces comprises dimples extending from an outer side of the one of the plurality of surfaces to an inside of the container.

13. The container according to claim 12, wherein the dimples adjoin adjacent dimples.

14. The container according to claim 13, wherein the dimples have a diamond cross-section.

15. The container according to claim 14, wherein each of the dimples have a constant length in a radial direction of the container.

16. The container according to claim 15, wherein a width of the dimples in a circumferential direction decreases between dimples when moving from an outer radial direction toward an inward radial direction.

17. A container, comprising:

a top having an opening configured to receive a product;

a bottom adjoining a sidewall that extends to the top of the container, the bottom forming the bottommost portion of the container;

a pushup wall extending upward from the bottommost portion inward of the sidewall, the pushup wall comprising a plurality of vertical ribs spaced circumferentially about the pushup wall;

a flexible panel having a plurality of surfaces that each extend radially around a longitudinal axis of the container, the flexible panel extending inward from an upper part of the pushup wall, the ribs each extending from the bottommost portion to the flexible panel; and a bullet-nose structure on the bottom of the container extending upward along a central longitudinal axis of the container, the bullet-nose structure having a concave top surface, wherein one of the plurality of surfaces comprises a downward ramp that adjoins the upper part of the pushup wall and extends away from the top of the container when moving inward along the downward ramp, another of the surfaces comprising an upward ramp that extends toward the top of the container when moving inward along the upward ramp, a bottommost portion of the bullet-nose structure being positioned below a topmost portion of the upward ramp, the plurality of surfaces further comprising a stage extending radially outward from the bullet-nose structure to the upward ramp, the stage extending perpendicular to the central longitudinal axis, the ramps each having a radial length that is twice that of the stage.

18. The container according to claim 17, wherein the downward ramp adjoins the upward ramp.

19. A container, comprising:

a top having an opening configured to receive a product;

a bottom adjoining a sidewall that extends to the top of the container, the bottom forming the bottommost portion of the container;

a pushup wall extending upward from the bottommost portion inward of the sidewall, the pushup wall comprising a plurality of vertical ribs spaced circumferentially about the pushup wall such that each of the ribs faces another one of the ribs;

a flexible panel having a plurality of surfaces that each extend radially around a longitudinal axis of the container, the flexible panel extending inward from an upper part of the pushup wall, one of the plurality of surfaces comprising a downward ramp that adjoins the upper part of the pushup wall and extends away from the top of the container and another of the surfaces comprises an upward ramp that extends toward the top of the container, the downward ramp adjoining the upward ramp, the ramps each being planar along their entire length;

dimples extending from the ramps to an inside of the container; and a bullet-nose structure on the bottom of the container extending as a convex structure upward along a central longitudinal axis of the container, a bottommost portion of the bullet-nose structure being positioned below a topmost portion of the upward ramp, wherein the plurality of surfaces further comprises a stage extending radially outward from the bullet-nose and radially inward from the upward ramp, the stage extending perpendicular to the central longitudinal axis, the ramps each having a maximum length that is twice that of the stage, and wherein the flexible panel is movable between a first position in which the bullet-nose structure is a first distance from the top and a second position in which the bullet-nose structure is a reduced second distance from the top, the bottom forming the bottommost portion of the container when the flexible panel is in both the first and second positions.

20. The container according to claim 4, wherein the flexible panel comprises a recessed portion between the bullet-nose structure and the stage such that the recessed portion is positioned below the stage.

* * * * *